(12) United States Patent
Saitou et al.

(10) Patent No.: US 6,319,409 B1
(45) Date of Patent: Nov. 20, 2001

(54) PROCESS FOR TREATING WASTE WATER CONTAINING CUTTING OIL

(75) Inventors: Yoshio Saitou; Masanori Kakemizu, both of Tokyo-To (JP)

(73) Assignee: Fuji Jukogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/393,811

(22) Filed: Sep. 10, 1999

(30) Foreign Application Priority Data

Sep. 11, 1998 (JP) .................................................. 10-258525

(51) Int. Cl.$^7$ ....................................................... C02F 1/56
(52) U.S. Cl. ......................... 210/626; 210/631; 210/705; 210/725; 210/727; 210/733; 210/734; 516/180
(58) Field of Search .................... 210/708, 705, 210/725, 727, 728, 733, 734, 626, 631; 516/142, 180

(56) References Cited

U.S. PATENT DOCUMENTS

| | | | |
|---|---|---|---|
| 3,377,274 | * 4/1968 | Burke et al. | 210/727 |
| 3,707,464 | * 12/1972 | Burns et al. | 210/710 |
| 3,948,784 | * 4/1976 | Krillic et al. | 252/26 |
| 4,059,515 | * 11/1977 | Fowler et al. | 210/736 |
| 4,492,636 | * 1/1985 | Burke | 210/706 |
| 5,330,656 | * 7/1994 | Hassick | 210/708 |
| 5,401,400 | * 3/1995 | Tonelli et al. | 210/151 |
| 5,433,853 | * 7/1995 | Mamone | 210/615 |
| 5,560,832 | * 10/1996 | Sivakumar et al. | 210/708 |
| 6,036,868 | * 3/2000 | Sivakumar et al. | 210/708 |

FOREIGN PATENT DOCUMENTS

| | | |
|---|---|---|
| 2-25474 | 1/1990 | (JP) . |
| 7-55703 | 3/1995 | (JP) . |

* cited by examiner

*Primary Examiner*—Peter A. Hruskoci
(74) *Attorney, Agent, or Firm*—Smith, Gambrell & Russell, LLP

(57) ABSTRACT

A process for treating waste water containing cutting oil is disclosed, which includes the steps of adding a cationic organic compound to waste water containing used cutting oil to coagulate water-insoluble matter in the water and to thereby form coagulated particles, adding an anionic organic polymer to cause those particles to grow into flocculated flocs, and separating the flocculated flocs. The process of the invention can treat waste water containing used cutting oil in an industrially beneficial way without producing a large amount of sludge.

9 Claims, 2 Drawing Sheets

PROCESS FOR TREATING WASTE WATER CONTAINING CUTTING OIL

BACKGROUND OF THE INVENTION

1. Field of the Invention

This invention relates to a process for treating waste water resulting from a cutting process in a machine plant, etc. (i.e., water containing used cutting oil composed of swarf and cutting oil, etc.).

2. Description of the Related Art

A cutting process in a machine plant, etc. uses cutting oil, and produces a large amount of waste water (a waste liquid) containing used cutting oil, i. e. cutting oil, swarf (or chips), etc. Such waste water containing used cutting oil has usually been treated by flocculation and flotation.

Japanese Patent Laid-Open No. 22547/1997, for example, describes a process which includes adding an inorganic flocculant, such as polyaluminum chloride, aluminum sulfate, ferrous chloride, and the like to a waste liquid containing oily matters to cause it to undergo a flocculating reaction, adding a polymeric flocculant, such as poly(meth)acrylamide, poly(meth)acrylic acid, and the like, to the (waste liquid after flocculated reaction to form flocs (cotton-like flocculated masses), and separating them by flotation. Japanese Patent Laid-open No. 075703/1995 describes a process which includes adding a silica type flocculant (a solution of blast furnace slag in dilute hydrochloric acid) to waste water containing a machine oil, to thereby grow a precipitate, and removing oily matter by flotation under pressure.

Although these processes using inorganic flocculants have made it possible to reduce the amount of a sludge to be thrown away, its reduction is still unsatisfactory, and a further reduction thereof is desired. Moreover, the inorganic flocculants are too costly to be suitable for use on an industrial basis.

There is also known a process which includes adding sulfuric acid having a concentration of, say, 5% to waste water containing cutting oil, swarf, etc. to raise its specific gravity and thereby float the swarf and oil, and flocculating them by using an inorganic flocculant, etc. The use of sulfuric acid is, however, likely to damage equipment, etc., though it may be effective for floating swarf and oil, and moreover, the use of an inorganic flocculant is not satisfactory for an effective reduction of sludge.

SUMMARY OF THE INVENTION

It is an object of this invention to provide a process which can treat waste water containing used cutting oil in an industrially beneficial way without producing a large amount of sludge.

This invention resides in a process for treating a waste water containing cutting oil which comprises the steps of adding a cationic organic compound to a waste water containing at least used cutting oil to coagulate at least water-insoluble matter in the water and to thereby form coagulated particles, adding an anionic organic polymer to cause those particles to grow into flocculated flocs, and separating the flocculated flocs (preferably by flotation).

DETAILED DESCRIPTION OF THE INVENTION

This invention is a process which facilitates the treatment of a waste water resulting from a cutting process in a machine plant, etc. [i. e., water containing cutting oil, swarf, etc. (usually in dispersion)], and which employs two specific kinds of organic flocculants instead of the metal compounds, or other inorganic flocculants as hitherto used, and thereby enables a drastic reduction in the amount of the sludge (dehydrated) which is eventually formed.

Figure 1:
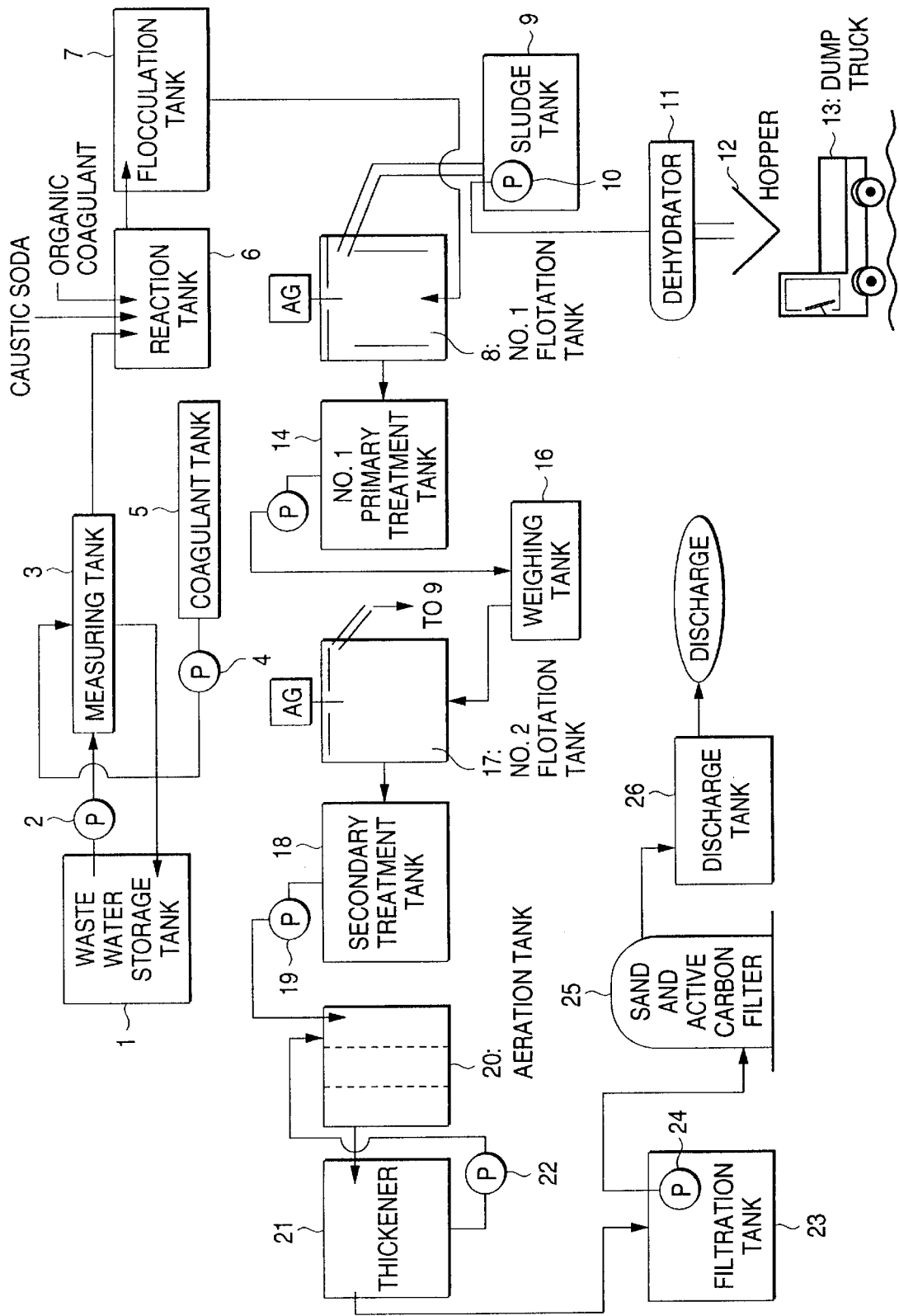
FIG. 1 is a flowchart showing one example of a process according to this invention.

The process of this invention can be carried out as will now be described by way of example with reference to FIG. 1.

A waste water collected from a plant by a tank lorry, etc., and containing used cutting oil, such as cutting oil and swarf, is transferred into a waste water storage tank 1, and stored therein. The waste water is drawn by a pump 2 into a measuring tank 3 in which it is measured, and any excess is returned into the storage tank 1 through a return pipe. Usually the transfer rate is 500 to 3,000 liters per minute.

A coagulant tank 5 stores a solution (usually a 1 to 20% by weight aqueous solution) containing a cationic organic compound as an organic coagulant. This solution is forced by a pump 4 into the measuring tank 3. The pump 4 is so connected as to start simultaneously with the pump 2. The pump 5 also stops with the pump 2. Thus, an appropriate amount of the solution containing a cationic organic compound is introduced into the measuring tank simultaneously with the waste water.

The solution is usually introduced in an amount of 0.1 to 5 liters (preferably 0.2 to 2 liters) for 1,000 liters of a waste water.

Figure 2:
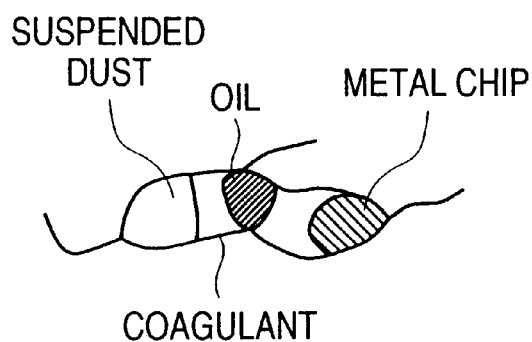
FIG. 2 is a diagram showing by way of example the structure of a coagulated particle formed by adding a cationic organic coagulant according to this invention to waste water.

The waste water and the cationic organic compound are mixed in the measuring tank as stated, and substances suspended (SS) in the water, metal chips (or swarf), oily matter, etc. are united by this compound to form coagulated particles as shown by way of example in FIG. 2. Soluble matters, such as metal ions and the like, are sometimes also be united by the addition of the above compound to form a part of coagulated particles. The coagulated particles are formed, obviously because the suspended substances, swarf, etc. having a negative charge and the above compound having a positive charge are united together.

The waste water to which the cationic organic compound has been added is introduced into a reaction tank 6. A strong alkali, such as caustic soda and the like, is automatically supplied into the reaction tank to adjust the pH of the water to a level of about 7. This pH level enables the coagulant and flocculant to exhibit the highest activity.

A solution (usually a 0.5 to 10% by weight aqueous solution) of an anionic organic polymer is then added as another organic coagulant to the waste water. This solution is usually introduced in an amount of 1 to 100 liters (preferably 10 to 50 liters) for 1,000 liters of the waste water.

The waste water to which the anionic organic polymer has been added is transferred into a flocculation tank 7 in which coagulated particles undergo flocculation to grow into flocculated flocs. The waste water usually stay in the flocculation tank for 20 to 50 minutes. As a result, the waste water is divided into two parts, flocculated flocs and water.

Figure 3:
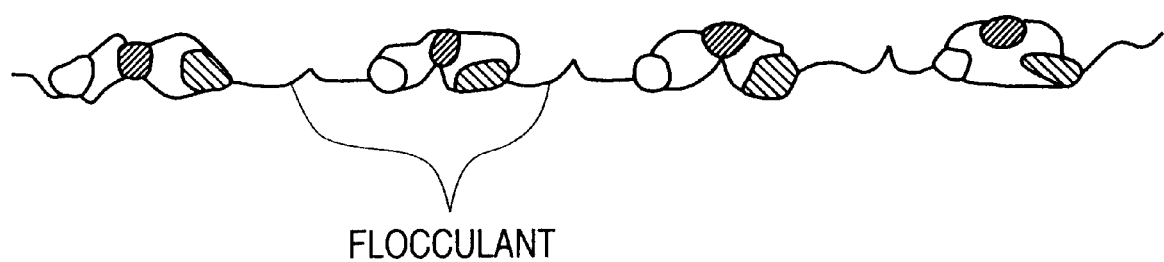
FIG. 3 is a diagram showing by way of example the structure of a flocculated floc formed by adding an anionic organic polymer as a flocculant according to this invention to waste water containing an organic coagulant.

The above flocculated flocs have a structure as shown by way of example in FIG. 3. The coagulated particles shown in FIG. 2 have predominantly a positive charge, while the anionic organic polymer has a negative charge and a high molecular weight. Therefore, it is obvious that the coagulated particles are easily united to form a fibrous flocculated floc.

The resulting flocculated flocs and water are transferred into No. 1 flotation tank 8. Microair is introduced into the flotation tank, so that large flocs may rise with the air and float on the surface of the liquid. The flotation tank 8 has a scraper by which the floating flocs are removed from the tank, and dropped into a sludge tank 9.

The flocs conveyed to the sludge tank contain a considerably large amount of water, and are dropped through a pump 10 into a dehydrator 11 below in which they are concentrated into a sludge, which is dropped into a hopper 12. The sludge leaving the hopper is carried by a dump truck 13, etc., and burned in an incinerator, etc.

The waste water from which the flocs have been removed in No. 1 flotation tank 8 is conveyed into a primary treatment tank 14. The water is, then, conveyed into a secondary treatment tank 18 if the removal of flocs has been satisfactory. If it is unsatisfactory, however, the water is conveyed through a measuring tank 16 into No. 2 flotation tank 17 in which it is subjected to flotation treatment again. The resulting flocs scraped here are also dropped into the sludge tank 9.

Water is supplied from a purification tank into the water in the primary treatment tank, or into the water as treated in No. 2 flotation tank, or if its BOD exceeds a specified value, industrial water is supplied, as desired.

The water conveyed to the secondary treatment tank 18 is conveyed through a pump 19 into an aeration tank 20. In the aeration tank, organic substances in the water are digested by an activated sludge. The water containing the activated sludge is drawn by a pump 22 into a thickener 21 in which the activated sludge settles, and a transparent supernatant is transferred into a filtration tank 23. The water is conveyed by a pump 24 from the filtration tank into a sand and active carbon filter 25, and the water leaving the filter is conveyed into a discharge tank 26, from which it is finally discharged.

Owing to the use of the specific organic coagulant and flocculant according to this invention as stated above, it is sufficient to use only a small amount of flocculant (or coagulant) to form flocculated flocs, and as they can be separated by flotation, it is possible to reduce the amount of the sludge (which is received in the hopper), as compared with what is produced by any known process.

This invention is characterized by using the specific organic coagulant and flocculant to form flocculated flocs, and separating them by flotation, and other processes, a method of flotation, etc., can be carried out in a known way as desired. For example, pressure, electrolytic, or oil separation can be employed as a method of flotation, in addition foam separation described above. Moreover, the treatment can be carried out on a batch basis, though it has been described as a continuous one. The treatment is usually carried out at an ambient temperature, and if heat is generated, the treatment is discontinued, or the apparatus is cooled.

The waste water containing used cutting oil is a water containing cutting oil, metal swarf (or chips) produced by cutting, and other organic matters (such as microorganisms and algae). It may, for example, contain mineral oils, esters of fatty acids, metals and other minerals (including elements such as S, Si, P, Al, Ca, Fe, Zn, Cu, Na, Mn, Ti, etc.), proteins, saccharides and surface active agents. They can visually be classified into a liquid phase, suspended or floating substances, and metal chips. One liter of the waste water may usually contain 500 to 5,000 mg (preferably 1,000 to 3,000 mg) of floating substances, 50 to 1,000 mg (preferably 50 to 100 mg) of cutting oil, and 500 to 2,000 mg (preferably 1,000 to 2,000 mg) of metal swarf. For the sake of simplicity, the amount of cutting oil which water may contain can be defined by hexane extraction (i.e. the amount of the oily component of cutting oil).

The cutting oil is an oil used during a cutting job on a metallic material for the purposes of e.g. reducing the friction between the material and a cutting tool during planing, cutting or drilling, removing the heat of friction therefrom and washing away swarf to prolong the life of the tool and give a smooth surface finish to the material. The cutting oil may be of the water-insoluble type, or of the water-soluble type (forming an emulsion). The water-insoluble cutting oil is a mixture of a petroleum oil with a fatty oil, flower of sulfur, a sulfurized fatty oil, etc., and the water-soluble cutting oil contains an emulsifier and a higher alcohol (and any substance as mentioned above, if required), and forms an emulsion when mixed with water. The total amount of these substances in waste water is, therefore, the amount of cutting oil which it contains.

A compound having an amino group, a substituted amino group or a quaternary ammonium salt group can usually be employed as the cationic organic compound used to form the coagulated particles according to this invention, and a polyamine compound is, among others, preferred. It may contain an ester group in the molecule, or may be used with an ester compound. The cationic organic compound preferably has a weight-average molecular weight of from 100 to 50,000, and more preferably from 200 to 30,000. It is preferably added in an amount of 5 to 100 ppm to the waste water containing used cutting oil.

A high polymer having a carboxyl group can usually be employed as the anionic organic polymer used to form the flocs according to this invention, and examples thereof are polyacrylic acid, polymethacrylic acid, a copolymer of acrylic or methacrylic acid and another polymerizable monomer [e.g. (meth)acrylic ester], a polyester containing carboxylic acid and a polyamide containing carboxylic acid, etc. Polyacrylic or polymethacrylic acid, or a copolymer containing acrylic or methacrylic acid is, among others, preferred. The polymer preferably has a weight-average molecular weight of from 100,000 to 100,000,000, and more preferably from 500,000 to 50,000,000. The anionic organic polymer preferably has an acid value of from 50 to 500, and more preferably from 100 to 300. It is preferable to add the anionic organic polymer in an amount of 5 to 1,000 ppm to the waste water containing used cutting oil.

The invention is described in more detail with reference to the following Example. However, it should not be construed that the invention is limited thereto.

EXAMPLE 1

The treatment of waste water was carried out in accordance with the flowchart shown in FIG. 1, as described below.

A waste water having the composition shown in Table 1 below was put in the waste water storage tank 1.

The coagulant tank 5 stored a 6% by weight aqueous solution of a cationic organic compound, EB-200 (product of Macken Co. Ltd. containing 25% by weight of an effective constituent) as an organic coagulant. The aqueous solution of EB-200 was introduced into the measuring tank at a rate of one liter per minute at the same time when the waste water was introduced thereinto at a rate of 1,500 liters per minute.

The waste water and the cationic organic compound were mixed in the measuring tank to form coagulated particles of substances suspended in the water (SS), metal swarf (or chips), oily matter, etc.

The waste water containing the aqueous solution of EB-200 was introduced into the reaction tank 6, and its pH was adjusted to about 7 with a strong alkali, such as caustic soda, etc. which was automatically supplied thereinto.

A 2% by weight aqueous solution of an anionic organic polymer, EDP-353 (product of Kurita Industrial Co., Ltd. containing 70% by weight of an effective ingredient), was added to the waste water at a rate of 45 liters per minute.

The waste water to which EDP-353 had been added was transferred into the flocculation tank 7 in which the coagulated particles were caused to grow into flocculated flocs. The water stayed in the flocculation tank for 20 minutes. As a result, the waste water was divided into two phases, flocculated flocs and water.

The resulting flocculated flocs and water were transferred into No.1 flotation tank 8, and air was introduced thereinto to cause large flocs to rise and float on the liquid surface. The floating flocs were removed from the flotation tank 8 by the scraper, and dropped into the sludge tank 9.

The flocs conveyed to the sludge tank and containing water were dropped into the hydrator 11 through the pump 10, and concentrated into a sludge, and the sludge was dropped into the hopper 12.

The water conveyed into the secondary treatment tank 18 after treatment in No. 2 flotation tank was conveyed by the pump 19 into the aeration tank 20, where the organic matter in the water was digested by an activated sludge. The water containing the activated sludge was transferred into the thickener 21, where the activated sludge was allowed to settle, and a transparent supernatant was conveyed into the filtration tank 23. The water in the filtration tank was filtered through the sand and active carbon filter 25 by the pump 24 and the water leaving the filter was discharged through the discharge tank 26.

Data on the waste water and the discharged water are shown in Table 1 below.

TABLE 1

|  | pH | BOD (mg/L) | SS (mg/L) | n-hexane extraction (mg/L) |
|---|---|---|---|---|
| Waste water | 5.5–6.3 | 31000 | 1000–3000 | 61.2 |
| Discharged water | 5.8–8.6 | 10 | 10 or less | 3 |

The metals detected in the waste water were Al, Ca, Fe, Zn, Cu, K, Na, Mn and Ti, and the amount thereof was as shown above. The products of n-hexane extraction were paraffin hydrocarbons and carboxylates (oil, etc.), i.e. the principal constituents of cutting oil. Not only the metals mentioned above, but also S, Si, P, proteins and saccharides were detected in the residue after the filtration of the waste water. A higher alcohol and a nonionic surface active agent produced by the condensation of polyethylene oxide were detected in the filtrate.

The amount of the sludge produced by the treatment was 2,250 kg per 100 $m^3$ of waste water.

Evaluation of waste water and water discharged after treatment:
(1) BOD (mg/l)—Biochemical oxygen demand;
(2) SS (mg/l)—Amount of suspended substances.

This invention is a process which facilitates the treatment of waste water resulting from a cutting process in a machine plant, etc. (i.e. water containing used cutting oil composed of swarf, cutting oil, etc.), and which employs two specific kinds of organic flocculants instead of the metal compounds, or other inorganic flocculants as hitherto used, and thereby enables a drastic reduction in the amount of the sludge (dehydrated) which is eventually formed. Moreover, there is little fear of the apparatus being damaged, since no inorganic acid, such as sulfuric acid, is used.

The process of this invention employing two specific kinds of organic flocculants can effectively treat waste water and remove cutting oil and swarf therefrom.

While the presently preferred embodiments of the present invention have been shown and described, it is to be understood that the disclosure is for the purpose of illustration and that various changes and modifications may be made without departing from the scope of the invention as set forth in the appended claims.

What is claimed is:

1. A process for treating a waste water containing cutting oil which comprises;
    adding a polyamine as a cationic organic compound to waste water containing cutting oil and to thereby coagulate at least water-insoluble matter in said waste water to form coagulated particles;
    adding a polyacrylic acid as an anionic organic polymer to cause said particles to grow into flocculated flocs;
    separating said flocculated flocs from said waste water by flotation;
    digesting organic substances in said waste water by activated sludge;
    settling said organic substances; and
    filtering said waste water.

2. A process as set forth in claim 1, wherein said waste water containing cutting oil contains 50 to 100 mg of cutting oil per liter.

3. A process as set forth in claim 1, wherein said waste water containing cutting oil contains 1,000 to 2,000 mg of metallic swarf per liter.

4. A process as set forth in claim 1, wherein said cationic organic compound is added in an amount of 5 to 100 ppm relative to the waste water containing cutting oil.

5. A process as set forth in claim 1, wherein said anionic organic polymer is added in an amount of 50 to 1,000 ppm relative to the waste water containing cutting oil.

6. A process for treating waste water containing cutting oil which comprises:
    adding a polyamine as a cationic organic compound to waste water containing cutting oil to thereby coagulate at least water-insoluble matter in said waste water to form coagulated particles;
    adding a polymethacrylic acid as an anionic organic polymer to cause said particles to grow into flocculated flocs;
    separating said flocculated flocs from said waste water by flotation;
    digesting organic substances in said waste water by activated sludge;
    settling said organic substances; and
    filtering said waste water.

7. A process for treating waste water containing cutting oil which comprises:
- adding a polyamine as a cationic organic compound to waste water containing cutting oil to thereby coagulate at least water-insoluble matter in said waste water to form coagulated particles;
- adding a copolymer containing acrylic or methacrylic acid and another polymerizable monomer as an anionic organic polymer to cause said particles to grow into flocculated flocs;
- separating said flocculated flocs from said waste water by flotation;
- digesting organic substances in said waste water by activated sludge;
- settling said organic substances; and
- filtering said waste water.

8. A process for treating waste water containing cutting oil which comprises:
- introducing waste water at a rate of 500–3000 liters per minute;
- adding 1–20% by weight aqueous solution of a cationic organic compound having an amino, substituted amino, or quaternary ammonium salt group into said waste water in order to form coagulated particles;
- adjusting the pH value of said waste water to about 7 by adding an alkali;
- adding 0.5–10% by weight aqueous solution of an anionic organic polymer having a carboxyl group into said waste water so as to form flocculated flocs;
- introducing air into said waste water so as to float said flocculated flocs;
- separating said flocculated flocs from said waste water;
- mixing further air into said waste water so as to float remaining flocculated flocs;
- removing said remaining flocculated flocs;
- digesting organic substances in said waste water with an activated sludge;
- permitting said organic substances to settle;
- filtering said waste water; and
- discharging said waste water.

9. A process for treating waste water containing cutting oil which comprises:
- introducing waste water at a rate of 1,500 liters per minute;
- adding 6% by weight aqueous solution of a cationic organic compound having an amino, substituted amino, or quaternary ammonium salt group and containing 25% by weight of an effective constituent into said waste water in order to form coagulated particles;
- adjusting a pH value of said waste water to about 7 by adding an alkali;
- adding 2% by weight aqueous solution of an anionic organic polymer having a carboxyl group and containing 70% by weight of an effective ingredient into said waste water so as to form flocculated flocs;
- introducing air into said waste water so as to float said flocculated flocs;
- separating said flocculated flocs from said waste water;
- mixing further air into said waste water so as to float remaining flocculated flocs;
- removing said remaining flocculated flocs;
- digesting organic substances in said waste water with an activated sludge;
- permitting said organic substances to settle;
- filtering said waste water; and
- discharging said waste water.

* * * * *